Feb. 7, 1967  SUEKICHI YUMINO  3,302,670

HIGH-TENSION BAND-SAW MACHINE

Filed Nov. 18, 1963  3 Sheets-Sheet 1

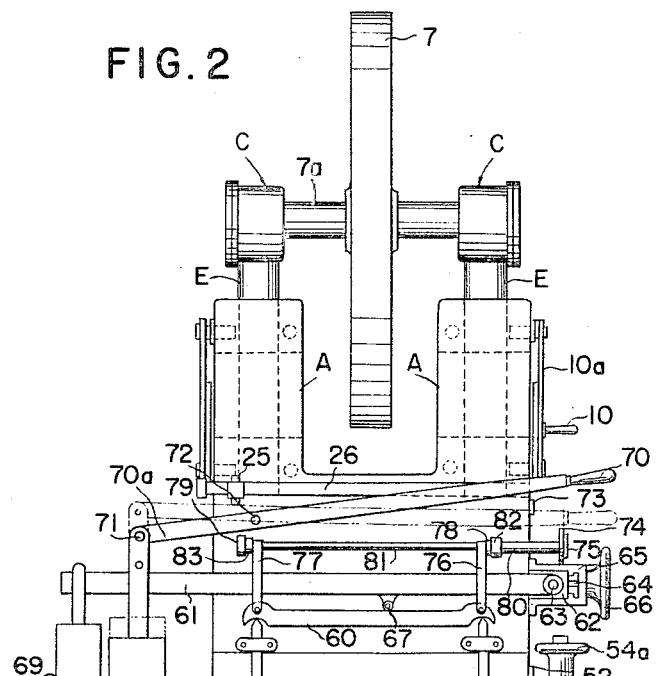
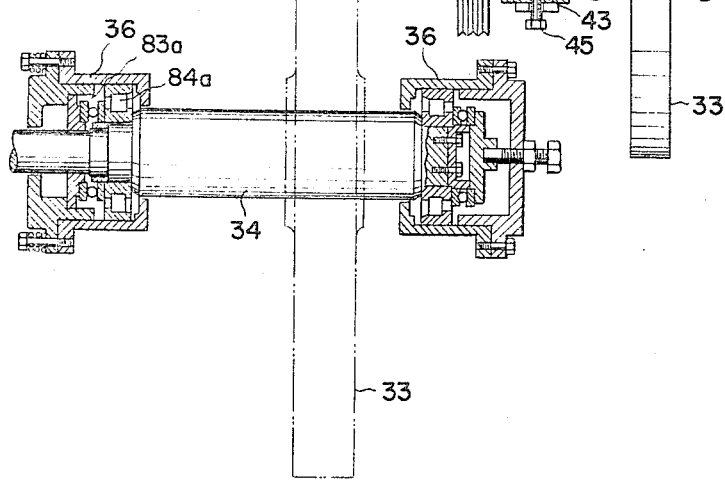

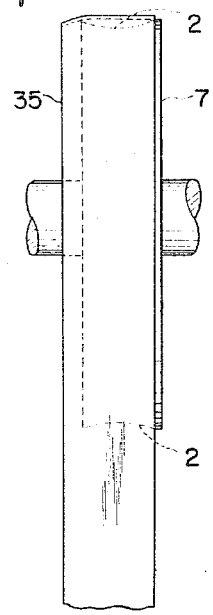
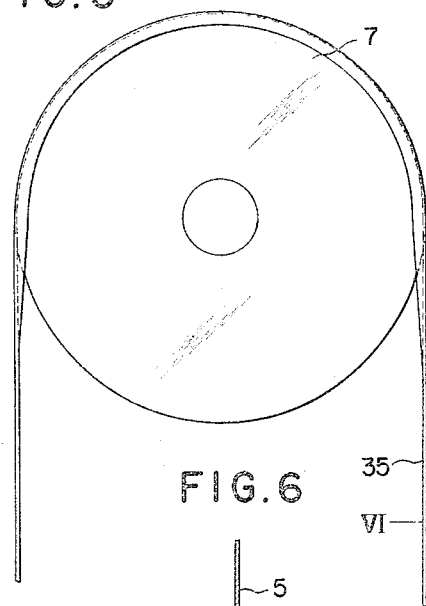
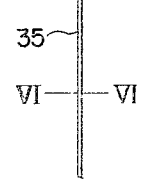
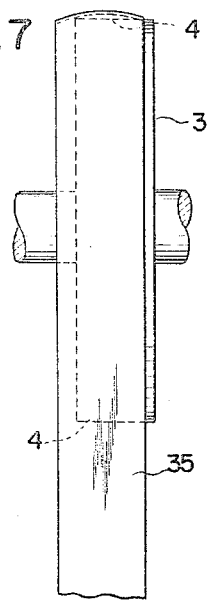
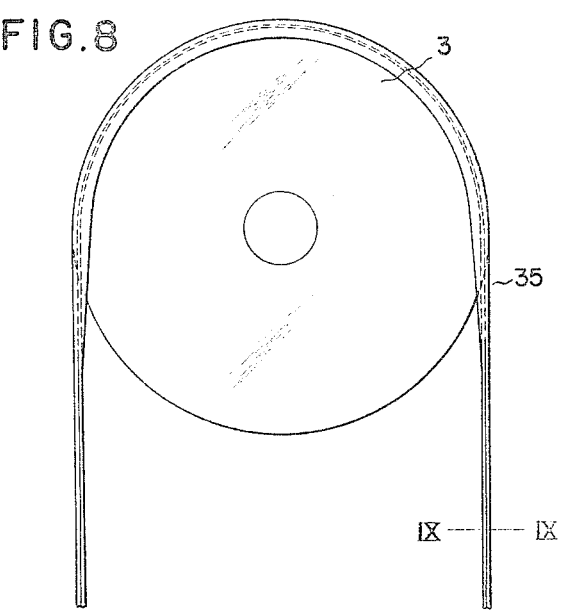
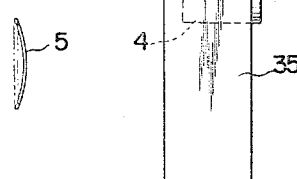

3,302,670
HIGH-TENSION BAND-SAW MACHINE
Suekichi Yumino, 2 6-chome Kitahachijonishi,
Sapporo-shi, Japan
Filed Nov. 18, 1963, Ser. No. 324,527
Claims priority, application Japan, Nov. 22, 1962,
37/52,820; Oct. 16, 1963, 38/54,697
3 Claims. (Cl. 143—27)

This invention relates to band saw machines and more particularly to a new and improved band-saw machine with highly desirable features. More specifically, the invention concerns a high-tension band-saw machine wherein, through appropriate utilization of an automatic stabilizing phenomenon and other characteristics of a band-saw blade, the upper and lower blade wheels are held stably, and vibration of the saw blade is reduced to an extremely low value, whereby the use of thin saw blades is made possible.

Heretofore, in the operation and control of band saw machines, it has been the conventional practice to rely on skill and intuition developed through long experience and to carry out sawing by applying as much tension as possible on the cutting edge side of the blades and with a projection of the saw-tooth root part of the blade of from 9 to 15 mm. from the blade wheel lateral faces as a criterion for correct practice. However, there is no theoretical basis, whatsoever, for this degree of blade tension and for the relative position of the saw blade with respect to the blade wheels.

As is well known, the frequent occurrence of cracks in the blades and failures and curved or wavy saw cuts have heretofore been considered to be an unavoidable disadvantage of band saws. In the operation of band saw machines, although the increase in tension on the saw blade is a universally desired expedient, it has hitherto never been realized in a practical manner because such increase in tension has given rise to occurrence of cracks in the blades.

In the conventional band saw machines, the shaft of one of the saw blade wheels is prevented from moving vertically, and the saw blade stretched over the upper and lower wheels is ordinarily tensioned by raising together and uniformly the two bearings of the upper wheel main shaft, the degree of tension applied being determined by the balance between the tension force and the load due to a counterpoise. If the machine, in this state, is started, the projection of the sawtooth root part outward from the lateral faces of the wheels will be in an uncontrolled state. Therefore, prior to the sawing operation, it has heretofore been necessary for the operator (known also as a "handle-man" in some localities) to adjust the vertical position of either of the main shaft bearings of the upper wheel to adjust the axial inclination of the wheel with respect to the vertical line so as to stabilize the quantity of the aforesaid projection suitably within the aforementioned range of 9 to 15 mm.

Because of the necessity for this adjustment, it has always been necessary to provide play between the member for the raising of at least one of the main shaft bearings of the upper wheel and the main frame or column of the band-saw machine, with the magnitude of the play being such as to permit sliding movement therebetween. As a natural consequence, this play induces vibration of the main shaft of the upper wheel during operation of the machine, giving rise to vibration of the saw blade. Such vibration is more frequently accompanied by resonance at higher operational speeds and with higher tension forces in the saw blade and is considered to lead thus to development of cracks in saw blades until finally a fracture occurs.

That is, as long as the necessity of this play is unavoidable, it is not possible to apply a desirably high tension on the saw blade and drive it at high speed, and conventional band-saw machines, in general, have been operated with insufficient tension in their saw blades. Consequently, these machines have produced wavy saw cuts, and even when there is no resonant vibration, the saw blades are constantly subjected to local differences in tension which produce repeated bending stresses, whereby the life of the saw blades is shortened.

More specifically, the tensile strengths of steels used for present-day band-saw blades are as high as 160 to 180 kg./mm.$^2$ or even higher. With such a high single tensile strength, a blade of, for example 1 mm. thickness and 125 mm. width should be able to withstand a load of 20 to 22.5 kilogram tons (or metric tons). However, the state of the prior art has been such that cracks occur in the blades with operation loads of the order of a mere 0.5 kg. tons.

In view of this state of the prior art, in which it is clearly apparent that a tremendous room for improvement in performance of band saws remains, research leading to the present invention was carried out on the premise that this improvement depends almose solely on the prevention of vibration. In the course of this research, it was found that when a bandsaw blade is driven in a state wherein it is stretched and riding over an upper wheel supported on main shaft bearings which are fixed to the main structural frame or column and a lower wheel supported on main shaft bearings which are adapted to be freely movable in any direction, the saw blade, irrespective of its type, automatically becomes stabilized at a constant relative position with respect to the upper and lower wheels, that is, the operating mechanism automatically becomes stabilized, without any operator adjustment procedure, in a state of constant axial orientation and position of the lower wheel and constant projection of the blade tooth root line from the lateral faces of the wheels. It was further discovered that, once the mechanism assumes this stable state, it persistently maintains this state even when the degree of blade tension is subsequently increased and cutting load is applied. The above-described operational result is the automatic stabilization phenomenon mentioned hereinbefore.

Another aspect of the present invention which received analytical attention in the course of the research was the fact that spherical roller bearings have heretofore been used for the main shaft bearings of the wheels because of the necessity of the aforedescribed adjustments prior to starting work and even during work. This type of bearing is of the self-aligning type and appears, at first consideration, to be a very logical choice. Upon further and deeper analysis, however, the following conclusions were reached. In this type of bearing, the load is transmitted from the outer race to the inner race (and thence to the main shaft) by way of symmetrically disposed rows of rollers, each of the rows having the configuration of a truncated cone, and the rollers being distributed between the outer and inner races and having rolling axes which are substantially inclined relative to the shaft axis. Consequently, if the point of application of the load is displaced from the center line of the bearing width, that is, in the axial direction away from the center plane of symmetry of the bearing, a thrust force (although of small magnitude) will always be created in the axial direction of the main shaft. In the case of a bandsaw machine, this displacement of load application probably occurs frequently, and there is strong evidence that the vibration due to the use of this type of bearing is by no means small. In fact, it has been confirmed in factories that the wear of the parts of the rollers of these bearings contacting the inner race shoulders is very conspicuous.

According to the present invention, therefore, this type of spherical bearing is replaced by a cylindrical roller bearing and a thrust ball bearing, and the alignment for the saw blade wheel requiring axial inclination relative to the vertical line is effected by means of a separate mechanism.

Accordingly, it is an object of the present invention to determine a bandsaw adjustment standard on the basis of the aforedescribed automatic stabilization phenomenon of saw blades, to produce a logical construction in accordance with this standard, thereby minimizing the vibration of the saw blade and making possible the use of saw blade tensions which can fully utilize the maximum levels of the saw blade tensile strength without causing cracks and failure in the blade, and thereby provide a high-tension bandsaw machine in which it is possible to use a saw blade which is substantially thinner than those conventionally used.

Heretofore, great effort has been expended in attempts to increase the tension of saw blades in bandsaw machines, and some attempts have been made to improve the material and configuration of the saw blade, the construction of the machine, and operational conditions such as the projection of the blade root from the lateral face of the wheels, but as mentioned hereinbefore, since there has been no definite standard, all adjustments of the saw blade have depended on judgment based on the conditions such as cracks and wavy saw cuts which appear as results. In contrast, in the case of the bandsaw machine according to the present invention, a standard which automatically becomes constant on the basis of the aforementioned automatic stabilization phenomenon is utilized. For this reason, it becomes possible to indicate quantitatively the adjustment state of the saw blade from this standard, and, moreover, it is possible to provide a mechanism by the use of which it is possible to vary the tension in the saw blade on the basis of this quantitative indication. This feature is one of the most important advantages of the present invention, which also has the following significant and highly advantageous features.

(1) In the bandsaw machine according to the present invention, since all of the bearings of the main shafts of the upper and lower saw blade wheels are fixed to the main structural frame of the machine, it is possible to reduce vibration to a remarkable degree.

(2) In the bandsaw machine of this invention, since the saw blade assumes the aforedescribed automatic stabilization state, an operator is not required at the time of starting.

(3) In the bandsaw machine of this invention, it is possible to increase greatly the tension in the saw blade because of its low degree of vibration, and, moreover, it is possible to carry out sawing with the use of a saw blade which is substantially thinner than conventional blades without the development of cracks therein. Accordingly, with a saw blade of, for example, 1 mm. thickness and 125 mm. width, a load of 2 kilogram tons can be applied which is considerably greater than the mere 0.5 kilogram ton of load which a blade of the same dimensions in a conventional machine could safely withstand. In other words, the sawing accomplished heretofore by means of a saw blade of 19 gauge thickness can be accomplished even more easily by the machine of the present invention by means of a blade of 22 gauge thickness to produce products with good sawn surfaces without saw cut waves. Furthermore, the present invention affords high production rates with extremely low quantities of sawdust waste.

The foregoing features are afforded by the present invention, which, briefly described, resides in a bandsaw machine essentially comprising a main structural frame, an upper saw blade wheel mounted on the frame, a hanger means suspended from the frame, a lower saw blade wheel mounted on the hanger, and a saw blade stretched over and supported on the upper and lower saw blade wheels, the upper and lower wheels being so adapted that their relative vertical distance can be adjusted. Each of main shafts of the upper and lower wheels is supported at each of its two ends by a combined bearing of a cylindrical roller bearing and a thrust ball bearing. Of the total of four bearing cases, the two bearing cases for the main shaft of the upper wheel can be fixed to the main structural frame, and the two cases for the main shaft of the lower wheel can be fixed to the hanger. The instant bandsaw machine is further provided with mechanism which permits the bearing cases for the main shaft of the lower wheel to move vertically and horizontally in directions perpendicular to the main shaft within certain limits, mechanism capable of quantitatively indicating the state of adjustment of the saw blade, and mechanism by means of which the saw blade can be adjusted on the basis of the state so indicated.

The present invention, in still another aspect thereof, concerns the prevention of the saw blade from assuming an arcuate cross section in its vertical part between the two wheels.

As mentioned hereinbefore, the saw blade is used with its toothed edge suitably projecting from the lateral faces of the wheels. Since the projecting part is not held, the entire saw blade has the tendency during high-speed operation to assume a spherical configuration. For this reason, when a saw blade is stretched over conventional wheels and rotated at high speed, the cross-sectional form of the saw blade in its straight part between the upper and lower wheels becomes arcuate.

Furthermore, in order to increase the strength of the tooth side and the back side of the saw blade for cutting, the saw blade is ordinarily reinforced, but such reinforcement promotes the tendency of the blade to assume an arcuate cross section.

Consequently, under the above-described condition, the direction of advance of the workpiece being cut and the direction of the cutting edge are not coincident, wherefore a wavy sawcut readily occurs. Moreover, under such a condition, the saw blade structure will contact the sawn surface, and the saw blade will be subjected to side pressure unless the set of the saw blade is made large.

It is, therefore, another object of the invention to prevent, as much as possible, the tendency of the saw blade during high-speed operation to assume an arcuate cross section and to provide an expedient whereby the cross section of at least the straight part of the saw blade between the upper and lower wheels is caused to become straight and not curved.

In order to indicate still more fully the nature and details of the invention, the following description with respect to a preferred embodiment thereof is presented below with reference to the accompanying drawings in which like part are designated by like reference characters, and in which:

FIG. 2 is an end elevational view, partly in vertical section and with parts cut away, of the machine shown in FIG. 1;

FIG. 3 is an enlarged end elevational view, mostly in vertical section, showing the essential parts of the main shaft bearing device of a saw blade wheel according to the invention;

FIG. 4 is a side elevational view of the upper wheel of band-saw machine according to the invention in operation, showing the state of the saw blade;

FIG. 5 is a front elevational view of the wheel and blade shown in FIG. 4;

FIG. 6 is a sectional view taken along the plane indicated by line VI—VI shown in FIG. 5;

FIG. 7 is a side elevational view of the upper wheel of a conventional bandsaw machine in operation, showing the state of the saw blade;

FIG. 8 is a front elevational view of the wheel and blade shown in FIG. 7; and

FIG. 9 is a sectional view taken along the plane indicated by line IX—IX shown in FIG. 8.

Figure 1A:
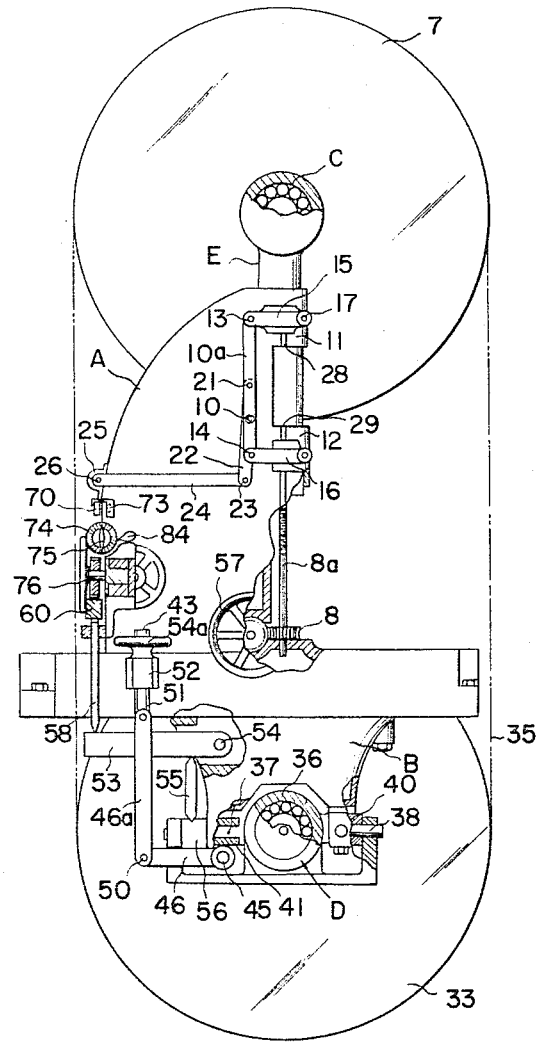
FIG. 1A is a side elevational view, partly in vertical section and with parts cut away, showing the essential parts of the embodiment of the band-saw machine according to the invention.
Figure 1B:
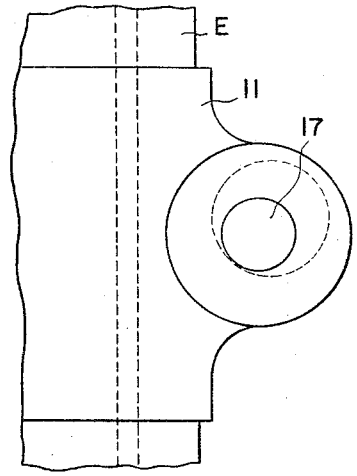
FIG. 1B is an enlarged side elevational view of a part of the embodiment of FIG. 1A.
Figure 1C:
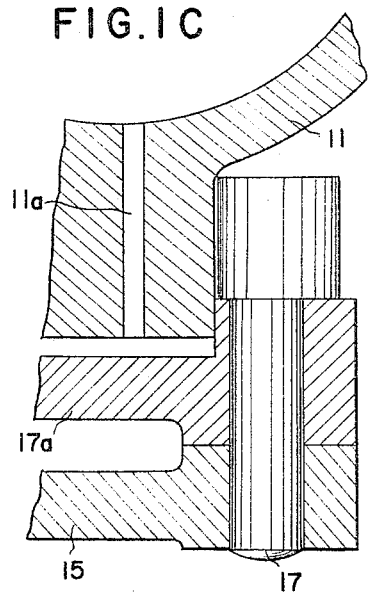
FIG. 1C is a plan view, partly in section, of the part of FIG. 1B.

The essential part of the embodiment of the band-saw machine according to the invention as shown in FIGS. 1A–1C and 2 are arranged substantially in the same manner as in a conventional machine of similar type. The machine essentially has a main structural frame A for installing the machine assembly on a floor, an upper wheel 7 the main shaft 7a of which is rotatably supported on bearings C, a pair of hangers B suspended from the main frame, a lower wheel 33 having a main shaft 34 rotatably supported on bearings D which are supported respectively on the hangers B, and a saw blade 35 supported on and stretched around the upper and lower wheels 7 and 33.

For the purposes of description, the operator's side of the machine and the side opposite thereto will be hereinafter referred to respectively as the front side and the rear side, and left and right directions will be taken as those as viewed by the operator facing the machine.

Each of the bearings C of the main shaft of the upper wheel 7 consists of a combined bearing consisting of a cylindrical roller bearing and a thrust ball bearing as shown and described hereinafter in connection with FIG. 3, both said bearings being housed within a bearing case which is integrally formed with a guide member E capable of sliding vertically along the main frame. The front and rear guide members E are adapted to be moved simultaneously and uniformly in the vertical direction by the turning of a control handle 57 of a mechanism comprising a front and rear pair of worms 8, worm wheels 9, and vertical shafts 8a connected to the worms 8, said worm wheels 9 being mounted on both sides of the shaft of said handle 57 and said shafts 8a being screwed respectively in said guide members E so that said guide members are raised or lowered by rotating said shafts 8a. Accordingly, the upper wheel 7 can be raised or lowered vertically without its axis being inclined by rotating the handle 57. When the upper wheel 7 is thus raised and reaches the objective position for suitable tension in the saw blade 35, guide member clamping covers 11 and 12 are securely clamped by the manipulation of a handle 10 to fix the guide members to the main frame A, whereby the upper wheel and the front and rear bearings of its main shaft are locked in the said objective position.

More specifically, when the handle 10 is raised, pins 13 and 14 of a linkage are raised through a lever 10a, whereby levers 15 and 16 of the same linkage are actuated to rotate eccentric shafts 17 and 18 each of which is supported by respective bracket 17a mounted on the machine frame. As a result, guide member clamping covers 11 and 12 clamp the guide members to the main frame A. The gaps 28 and 29 between these clamping covers 11 and 12 and the main frame are provided with oil-resistant hard rubber 11a fitted thereinto as packing material. On the side opposite to that on which the eccentric shafts 17 and 18 of the covers 11 and 12 are respectively engaged, there is provided a flange which is secured by bolts to the main frame also over oil-resistant hard rubber interposed therebetween.

The guide member of the front bearings of the upper wheel main shaft is thus locked to the main frame A. A similar mechanism is provided at the rear of the main frame also for the guide member of the rear bearings. This rear mechanism is operated simultaneously with the aforesaid front mechanism by the aforementioned manipulation of the handle 10 through a coupling mechanism comprising a lever 22 connected at one end to the lever 10a by a pivotal pin 21, a horizontal lever 24 connected at one end to the other end of said lever 22 by a pin 23, a coupling shaft 26 coupled at one end to a hole in the other end of the lever 24, a pair of brackets 25 mounted on the main frame A and supporting the said coupling shaft 26, and a similar linkage on the rear side connected to the opposite end of the said coupling shaft 26 and made up of two successively connected levers corresponding to the horizontal lever 24 and the lever 22. The guide members, which respectively raise or lower the pair of bearings supporting the two ends of the upper wheel main shaft, are thus locked or unlocked simultaneously by the manipulation of the handle 10.

On one hand, a weight 68 which is connected by a pin 71 to the end of a lever 70a extending from a handle 70 is adapted to be lifted by the lowering manipulation of the handle 70 from its position indicated by full line in FIG. 2 to that indicated by the dot-dash line through the pin 71 and a pivotal pin 72 and to be separated from the load position with respect to a weight beam 61 described hereinafter. This positional state of the weight 68 indicated by dot-dash line in FIG. 2 can be maintained by the engagement of the lever 70a with a catch 73 fixed to the main frame.

The main shaft 34 of the lower wheel 33 is supported at each of its front and rear ends by a cylindrical roller bearing 84a and a thrust ball bearing 83a as shown in FIG. 3. These two bearings are housed within a bearing case 36 which in turn is provided on opposite sides thereof with two coaxial trunnions 37 and 38 (FIG. 1A) extending outwardly along a horizontal axis which is perpendicular to the main shaft axis. The righthand trunnion 38 of the bearing case 46 is pivotally fitted into a center hole in a cross metal 40, the axis of the center hole being perpendicular to the axis of the main shaft of the cross metal 40. The cross metal 40 is pivoted at its front and rear trunnions in the holes provided in the corresponding hanger B. A square metal 41 is fitted to the left-hand trunnion 37 on the bearing case 36, and by the functioning of a guide provided on the corresponding hanger, the vertical movement of the trunnion 37 is made possible, but the frontward and rearward movement of the trunnion 37 is prevented. A sleeve 56 for receiving a knife edge is fitted onto the trunnion 37 to the left of and adjacent to the square metal 41.

The above-described construction around the bearings of the lower wheel main shaft at the front and rear are the same. Each of the front and rear sleeves 56 receives the lower end knife edge of a short rod 55, the upper end knife edge of which is engaged with knife edge bearing groove on the lower side of a lever 53 which is pivotally supported at one end by a pin 54 to the corresponding hanger B. The front and rear levers 53 are provided at their ends opposite their pivoted ends with upwardly facing knife edge bearing grooves to receive respectively the lower end knife edges of long rods 58 and 59, which are provided also at their upper ends with knife edges engaged with downwardly facing knife edge bearing grooves at the front and rear ends of a connecting bar 60, which is thereby supported. The connecting bar 60 is held by a roller 67 provided on the lower side of the aforementioned weight beam 61. Flat bars 76 and 77, which are substantially vertically orientated, are pivoted at their lower ends respectively to the front and rear ends of the connecting bar 60 and are connected at their upper ends respectively to the ends of cranks 78 and 79. The crank 78 is connected to a hollow member 80 which is supported on a bearing bracket 82 mounted on the main frame and has at its front end a calibrated dial plate 74. The crank 79 is directly coupled to a thin shaft 81 which is supported by a bearing bracket 83, mounted also on the main frame, and by the hollow member 80 through which it passes and is provided at its front end with an indicating pointer 75 fixed thereto and disposed in front of the calibrated dial plate 74. Thus, the vertical movements of the flat bars 76 and 77 respectively cause the hollow member 80 and the thin shaft 81 to rotate, and the relative resultant rotation so produced is read by means of the dial plate 74 as indicated by the pointer 75. A fixed pointer 84 is provided to point to an arbitrary reading on the calibration scale inscribed on the periphery of the dial plate 74.

The weight beam 61 is pivoted at its front end by a pin 63 and a cross metal 62 which is slidable within a guide of a bracket 65 mounted on the main frame. The weight beam 61 can be moved forwardly or rearwardly by the manipulation of a handle 66 fixed to a screw spindle 64 which is connected to the cross metal 62. A weight 69 is suspended from a point near the rear end of the weight beam 69.

When tension is applied to the saw blade 35 by raising the guide members E by means of manipulation of the handle, the above-described mechanism operates to raise the weight 69 through the long rods 58, 59, connecting bar 60, roller 67, and weight beam 61, and the magnitude of the tension can be read by means of the indication device 74, 75.

The aforementioned bearing case 36 is adapted to be controllably adjusted in vertical position by a mechanism comprising a cam-shaft 45 mounted on the front hanger and adapted to vertically move the bearing case 36, a lever 46 connected at one end to the cam-shaft 45 and at the other end by a pin 50 to the lower end of a vertical link 46a, and a screw spindle 43 connected at its lower end by a pin 51 to the upper end of the link 46a and engaged with the internal thread of a handle 54a supported on a bracket 52 mounted on the main frame, the cam-shaft 45 being rotated by the rotative manipulation of the handle 54 to cause the bearing case 36 to move vertically.

A coil spring 43 is inserted between the lower surface of the aforementioned square metal 41 fitted to the trunnions of the bearing case of the rear bearing of the lower wheel main shaft and the lower end cover of the rear hanger and functions to compensate for the weight of the lower wheel. In addition, an adjusting bolt 44 is passed through the cover in threaded engagement therewith and, extending through the center of the spring 43, functions to fix the square metal 41.

Referring to FIG. 4, each of the upper and lower wheels 7 and 33 according to the present invention has a concave peripheral surface 2, the effect of which will be described hereinafter.

*Operation*

The operation of the band saw machine according to the present invention is essentially as described hereinbelow.

First, the handle 70 is lowered by the operator and caused to be held by the catch 73, thereby removing the load imposed by the weight 68 on the weight beam 61. The saw blade 35 is placed over the upper and lower wheels 7 and 33, and by manipulating the handle 57, the upper wheel 7 is raised to impart tension on the saw blade 35. Next, the handle 10 is manipulated to clamp the guide members E to the main frame by means of the guide member clamping covers 11 and 12, thereby locking the bearing cases of the upper wheel shaft to the main frame.

The above-described tensioning of the saw blade 35 causes movement in the indication device 74, 75, the indication of which is then read. Then the handle 70 is released from the catch 73, and, as the load of the weight 68 is repeatedly applied on and removed from the weight beam 61, the saw blade is turned by hand. During this procedure, the indication device 74, 75 is observed to verify that its movements are uniformly coincident. If a difference in these movements is observed, the handles 66 and 54a are manipulated to adjust the position of the roller 67 of the weight beam 61 on the connecting bar 60 and the position of the cross metal 40 of the bearing case of the lower wheel shaft until the coincidental point is determined. This coincidental point of the movements of the indication device 74, 75 signifies a state of balance of the tensions in the cutting side and the back of the saw blade, and the cutting operation is started with the machine in this state.

In a conventional band saw machine, as shown in FIGS. 7, 8, and 9, the peripheral surface 4 of each saw blade wheel 3, has in general been flat. In such a case, when a saw blade is placed over such wheels, and the machine is operated at high speed, the saw blade tends to curve, and the straight blade part between the upper and lower wheels, that is, the working section, assumes an arcuate cross section 5 as indicated in FIG. 9 and as was mentioned hereinbefore. In contrast, the saw blade wheel (7 or 33) according to the present invention has a concave peripheral surface 2 as shown in FIG. 4. Therefore, when the saw blade 35 is placed over these wheels and placed under extremely high tension according to the invention, and the machine is operated at high speed, the straight blade part between the upper and lower wheels assumes a straight-line cross section 6 as shown in FIG. 6. This favorable result is considered to be due to the tendency of the blade caused by its resilience exhibited when the reinforced blade is pressed by a tension against the concave surface 2 of the wheel.

It has been found that the saw blade used in the present machine exhibits substantially no vibration during operation and, in external appearance, appears as though it were at rest. Accordingly, the present invention affords numerous advantages such as the prevention of curved or wavy saw cuts and the elimination of striped saw cut patterns on the workpiece sawn surfaces due to periodic vibration of the saw blade in the side direction (that is, the direction of the line IX—IX shown in FIG. 8), which patterns have frequently been experienced heretofore.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. A band saw machine comprising a main frame, hangers supported by the main frame, an upper saw blade wheel mounted for rotary movement in the main frame, a lower saw blade wheel mounted for rotary movement in the hangers, a saw blade trained over said upper and lower saw blade wheels, said upper and lower wheels being adjustable for varying the vertical distance therebetween, each of said upper and lower wheels having a main shaft with opposite ends, a combined cylindrical roller bearing and a thrust ball bearing for the respective ends of each main shaft, a case enclosing each of said combined bearings, means for mounting the bearing cases of the main shaft for the upper wheel to the main frame, means for mounting the bearing cases of the main shaft for the lower wheel to be freely movable in said hangers vertically and in a horizontal direction perpendicular to the axis of the main shaft within certain limits, a mechanism capable of providing a quantitative indication of the state of adjustment of the tension distribution in the saw blade through utilization of an automatic stabilization phenomenon, and mechanism capable of adjusting the saw blade, said indicating mechanism including a connecting bar actuated by adjustment displacements of the bearings for the main shaft of the lower wheel, two flat bars pinjointed respectively to the ends of the connecting bar, two rotatable shafts respectively coupled to and actuated by the flat bars, a calibrated dial means coupled to and actuated by one of the rotatable shafts, an indicating pointer coupled to and actuated by the other of the rotatable shafts, and the pointer being adapted to function cooperatively with the dial means to provide a quantitative indication, 2. The band saw machine as claimed in claim 1 in which said adjustment mechanism includes having opposite ends said adjustment mechanism includes a weight beam having opposite ends pivoted at one end to means to displace the end adjustably only in the horizontal longitudinal direction of the beam and provided at the other end with a first weight, a roller having a shaft rotatably supported by the weight beam and adapted to roll along and on the connecting bar, and means to apply and remove a second weight on and from the weight beam at a point near its end provided with the first weight.

3. The band saw machine as claimed in claim 1 wherein said saw blade is planar and the upper and lower saw blade wheels have concave peripheral surfaces so that during high speed operation the blade is pressed by tension against the concave surfaces and the blade area between said wheels assumes a straight line cross section.

References Cited by the Examiner

UNITED STATES PATENTS

| | | | |
|---|---|---|---|
| 339,728 | 4/1886 | Atkins | 143—30 |
| 446,293 | 2/1891 | Richards | 143—27 |
| 477,299 | 6/1892 | Emerson | 143—27 X |
| 1,486,632 | 3/1924 | Campbell | 143—31 |

FOREIGN PATENTS

| | | |
|---|---|---|
| 885,475 | 8/1953 | Germany. |
| 14,362 | 5/1897 | Switzerland. |

DONALD R. SCHRAN, *Primary Examiner.*